United States Patent
Heimberger et al.

(10) Patent No.: US 9,581,694 B2
(45) Date of Patent: Feb. 28, 2017

(54) METHOD FOR THE IMPROVED ACTUATION OF ULTRASONIC SENSORS, DRIVER ASSISTANCE DEVICE AND MOTOR VEHICLE

(71) Applicant: VALEO Schalter und Sensoren GmbH, Bietigheim-Bissingen (DE)

(72) Inventors: Markus Heimberger, Besigheim (DE); Heinrich Gotzig, Vaihingen a. d. Enz (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 65 days.

(21) Appl. No.: 14/423,616

(22) PCT Filed: Aug. 13, 2013

(86) PCT No.: PCT/EP2013/066871
§ 371 (c)(1),
(2) Date: Feb. 24, 2015

(87) PCT Pub. No.: WO2014/032959
PCT Pub. Date: Mar. 6, 2014

(65) Prior Publication Data
US 2015/0323668 A1    Nov. 12, 2015

(30) Foreign Application Priority Data

Aug. 25, 2012   (DE) ........................ 10 2012 016 866

(51) Int. Cl.
*G01S 15/93*    (2006.01)
*G01S 15/02*    (2006.01)
(Continued)

(52) U.S. Cl.
CPC .......... *G01S 15/876* (2013.01); *G01S 15/025* (2013.01); *G01S 15/42* (2013.01); *G01S 15/52* (2013.01);
(Continued)

(58) Field of Classification Search
CPC ........ G01S 15/931; G01S 15/52; G01S 15/42; G01S 15/66; G01S 15/876; G01S 15/025; G01S 15/58; G01S 2015/938
See application file for complete search history.

(56) References Cited

U.S. PATENT DOCUMENTS

| | | | |
|---|---|---|---|
| 2006/0271296 A1 | 11/2006 | Takeichi et al. | |
| 2012/0327239 A1 | 12/2012 | Inoue et al. | |
| 2015/0323668 A1* | 11/2015 | Heimberger | G01S 15/931 367/96 |

FOREIGN PATENT DOCUMENTS

| | | |
|---|---|---|
| DE | 35 40 704 A1 | 5/1987 |
| DE | 43 36 288 C1 | 3/1995 |

(Continued)

OTHER PUBLICATIONS

International Search Report for corresponding International Search Report PCT/EP2013/066871, mailed Nov. 5, 2013 (2 pages).
(Continued)

*Primary Examiner* — Daniel Pihulic
(74) *Attorney, Agent, or Firm* — Osha Liang LLP

(57) ABSTRACT

A method for operating an ultrasonic system having a multiplicity of ultrasonic sensors is disclosed. The sensors are arranged distributed on a motor vehicle and are actuated in measuring cycles for the emission of an ultrasonic signal, where the measuring cycles are repeated. An object in the surroundings of the motor vehicle is detected by a detection device, different from the ultrasonic system, of the motor vehicle, and a relative position of the object relative to the motor vehicle is determined. The number of ultrasonic
(Continued)

sensors which are actuated within one measuring cycle is then defined as a function of the current relative position.

15 Claims, 3 Drawing Sheets

(51) Int. Cl.
    *G01S 15/42*     (2006.01)
    *G01S 15/66*     (2006.01)
    *G01S 15/87*     (2006.01)
    *G01S 15/52*     (2006.01)
    *G01S 15/58*     (2006.01)

(52) U.S. Cl.
    CPC .............. *G01S 15/58* (2013.01); *G01S 15/66* (2013.01); *G01S 15/931* (2013.01); *G01S 2015/938* (2013.01)

(56) References Cited

FOREIGN PATENT DOCUMENTS

| | | |
|---|---|---|
| DE | 10 2008 061 359 A1 | 6/2010 |
| DE | 10 2009 000 401 A1 | 7/2010 |
| DE | 10 2009 060 177 A1 | 10/2010 |
| DE | 10 2010 033 209 A1 | 2/2012 |
| DE | 10 2010 046 291 A1 | 5/2012 |
| DE | 102012016866 A1 * 2/2014 | ........... G01S 15/931 |
| DE | WO 2014032959 A1 * 3/2014 | ........... G01S 15/931 |
| DE | KR 20150048186 A * 5/2015 | ........... G01S 15/931 |
| DE | EP 2888602 A1 * 7/2015 | ........... G01S 15/931 |
| GB | 2 392 979 A | 3/2004 |
| JP | 2006317185 A | 11/2006 |
| JP | 2006317186 A | 11/2006 |
| KR | 19980039052 U | 9/1998 |
| WO | 2005066656 A1 | 7/2005 |
| WO | 2010146619 A1 | 12/2010 |
| WO | 2011145141 A1 | 11/2011 |

OTHER PUBLICATIONS

Search Report for corresponding German Application No. 10 2012 016 866.7, mailed Apr. 5, 2013 (5 pages).
Notification of Reason for Refusal issued in corresponding Korean Application No. 10-2015-7007433, mailed Jul. 18, 2016 (9 pages).
Office Action issued in corresponding Japanese Application No. 2015-527857, mailed May 10, 2016 (3 pages).

* cited by examiner

METHOD FOR THE IMPROVED ACTUATION OF ULTRASONIC SENSORS, DRIVER ASSISTANCE DEVICE AND MOTOR VEHICLE

The invention relates to a method for operating an ultrasonic system having a multiplicity of ultrasonic sensors which are arranged distributed on a motor vehicle and which are actuated in measuring cycles for the emission of an ultrasonic signal, wherein the measuring cycles are repeated. The invention also relates to a driver assistance device for carrying out such a method, and also to a motor vehicle having such a driver assistance device.

Document DE 10 2009 000 401 A1 discloses a device for a motor vehicle, which device can prevent a collision between the motor vehicle and an object. A multiplicity of ultrasonic sensors which detect a first object information item of the object are arranged distributed on the motor vehicle. Independently of this, an optical measuring system, for example a video camera, detects a second object information item of the object. The first and the second object information items are combined with one another by means of a correlation device. This permits plausibility checking of the objects and merging of the object information items.

Document DE 43 36 288 C1 describes a driver assistance system having a camera and having additional sensors. The camera is pivotably arranged on a motor vehicle, wherein a camera-side pivoting device is actuated as a function of signals of the additional sensors.

The emphasis here is, in particular, on a driver assistance system which assists the driver of a motor vehicle when parking in a parking space or when driving out of the parking space. Such a driver assistance device is also known by the term "parking aid". Distances between the motor vehicle and vehicle-external objects are measured here by the driver assistance device while the driver is maneuvering his motor vehicle. The driver is then informed about these distances, specifically with the aid of an optical display device, for example a display, and/or by means of an acoustic output device, specifically a loudspeaker. For this purpose, ultrasonic sensors are mounted on both the front and rear bumpers of the motor vehicle. For example, in each case four or six ultrasonic sensors can be provided which are arranged distributed on the respective bumper along the circumference of the motor vehicle. Objects are therefore detected both in front of and behind the motor vehicle. For optimum coverage of the entire area of the surroundings in front of and behind the motor vehicle, as a rule a plurality of ultrasonic sensors of the same design are used. The ultrasonic sensors can also cover a region next to the side edges of the motor vehicle.

If the sensors of one vehicle side were actuated simultaneously, the ultrasonic sensors would influence one another. One ultrasonic sensor could then receive the sound signal of another ultrasonic sensor and the measurement results could then be falsified. In order to avoid this during a normal measurement, in the prior art the ultrasonic sensors are actuated one after the other in a predetermined sequence, with the result that the ultrasonic sensors one after the other emit the respective ultrasonic signals. When this sequence has been run through once from the first ultrasonic sensor to the last ultrasonic sensor, a measuring cycle is concluded. These measuring cycles are then repeated.

Within one measuring cycle, a time window of, for example, 20 milliseconds is defined for each ultrasonic sensor, within which time window this ultrasonic sensor is to emit its ultrasonic signal and, if appropriate, receive an echo or a plurality of echos. After the expiry of this time window, the next ultrasonic sensor is then actuated to emit its ultrasonic signal, and a corresponding time window is then waited for again until the next ultrasonic sensor can transmit further. If then a total of six ultrasonic sensors are present, the duration of an individual measuring cycle is 120 milliseconds. This period duration may, if appropriate, also be shortened in that two ultrasonic sensors transmit simultaneously, wherein it is ensured here that these ultrasonic sensors cannot interfere with one another. In the most favourable case, the duration of an individual measuring cycle is therefore 60 milliseconds when there are six ultrasonic sensors.

A total of 60 milliseconds to 120 milliseconds is therefore necessary until an ultrasonic sensor can at all detect the object in the surroundings of the motor vehicle. However, it can also be the case that ultrasonic sensors of other vehicles output ultrasonic signals. These extraneous ultrasonic signals are interference echos and can therefore influence the measurement of the vehicle's own ultrasonic sensors. The driver assistance device then has to detect the interference echos and filter them out so that they do not give rise to a falsified display. This is done, for example, using plausibility checking: an ultrasonic sensor must detect the object at approximately the same distance over a predetermined number of measuring cycles for this object to be able to be interpreted as an actually existing object. Only then is the detected object signalled to the driver. Overall, a time of several measuring cycles therefore has to pass until the object can ultimately be interpreted as detected. If, for example, three measuring cycles are waited for, it takes a total of, for example, 360 milliseconds until the detected object can be displayed to the driver. This corresponds to inert behaviour and is disadvantageous overall because the reaction time to newly appearing objects which enter the detection range of the ultrasonic sensors is correspondingly long.

This is remedied to a certain extent by a method as described in document DE 10 2010 033 209 A1 by the applicant's company. It is proposed here to actuate an ultrasonic sensor at least twice within a measuring cycle if this ultrasonic sensor detects a vehicle-external object in a preceding measuring cycle. The duration which is necessary for checking the plausibility of the presence of the object is therefore reduced.

The object of the invention is to indicate a solution for improving, in a method of the generic type mentioned at the beginning, the reaction time of the ultrasonic system to new objects compared to the prior art.

This object is achieved according to the invention by means of a method, by means of a driver assistance device and also by means of a motor vehicle having the features according to the respective independent patent claims. Advantageous embodiments of the invention are the subject matter of the dependent patent claims, of the description and of the figures.

A method according to the invention serves to operate an ultrasonic system having a multiplicity of ultrasonic sensors which are arranged distributed on a motor vehicle and which are actuated in measuring cycles for the emission of an ultrasonic signal, wherein the measuring cycles are repeated. An object in the surroundings of the motor vehicle is detected by means of a detection device, different from the ultrasonic system, of the motor vehicle, and a relative position of the object with respect to the motor vehicle is determined. The number of ultrasonic sensors which are actuated within the individual measuring cycles is then defined as a function of the current relative position, determined by the separate detection device.

Accordingly it is proposed that the information about the current position of an object which is determined by means of a detection device which is usually present in any case in the motor vehicle should also be taken into account during the configuration of the measuring cycles and during the actuation of the ultrasonic sensors in that the number of ultrasonic sensors to be actuated and therefore the number of ultrasonic sensors participating in the monitoring of the surroundings within a measuring cycle is determined as a function of the current relative position of the object with respect to the motor vehicle. As a result, for example only those ultrasonic sensors which can at all detect the detected object or else into whose detection ranges the detected object moves can be actuated. Overall, only those ultrasonic sensors which are also actually necessary to measure the distance between the object and the motor vehicle can therefore be actuated. Because as a result only a subgroup of the ultrasonic sensors present can be actuated within a measuring cycle, the duration of an individual measuring cycle is therefore reduced compared to the prior art, with the result that overall the reaction time of the ultrasonic system to new objects is also improved.

The term "actuation" means here, in particular, an individual measuring process of an ultrasonic sensor. The actuation of an ultrasonic sensor therefore includes the fact that this ultrasonic sensor emits an ultrasonic signal, and, if appropriate, receives a sound signal which is reflected by an object.

In one embodiment there is provision that the sequence of the actuation of the ultrasonic sensors within a measuring cycle is also defined as a function of the current relative position of the object with respect to the motor vehicle. This further reduces the reaction time of the ultrasonic system because that ultrasonic sensor which can also detect the object can be actuated first.

For example it is possible to provide here that within the measuring cycle that ultrasonic sensor in whose detection range the object is located, or else—if the object is, for example, not yet located in the detection range of the entire ultrasonic system—into whose detection range the object is moving, is actuated as the first sensor. As a result, that ultrasonic sensor which is relevant for the current position of the object is actuated as the first sensor within the measuring cycle. As a result, the object can be detected particularly quickly by the ultrasonic system.

In a further embodiment, within the measuring cycle that ultrasonic sensor which is closest to the object is actuated as the first sensor, that is to say first. This embodiment proves advantageous, for example, when the object is located simultaneously in respective detection ranges of two separate ultrasonic sensors. Here, on the basis of the relative position of the object with respect to the motor vehicle it is possible to estimate which of the ultrasonic sensors is closest to the object, and that ultrasonic sensor which is at the shortest distance from the object can be actuated first within the measuring cycle.

In yet a further embodiment, within the measuring cycle that ultrasonic sensor in whose direction the detected object is moving is actuated as the first sensor.

As already stated, the number of ultrasonic sensors which are used within a measuring cycle is defined as a function of the current relative position of the object with respect to the motor vehicle. In particular, this means that within a measuring cycle only a subset of the ultrasonic sensors which are selected as a function of the position of the object can be actuated. It can be provided here that exclusively one single ultrasonic sensor or else exclusively two ultrasonic sensors of the ultrasonic system are actuated within the measuring cycle.

Within the measuring cycle, only at least one of the following ultrasonic sensors is preferably actuated:
that ultrasonic sensor in whose detection range the object is located, and/or
that ultrasonic sensor into whose detection range the object is moving when the object is therefore moving in the direction of the detection range of this ultrasonic sensor.

The number of actuated ultrasonic sensors is therefore reduced to a minimum and exclusively those ultrasonic sensors which are also actually required for the detected system are actuated. The reaction time of the ultrasonic system is therefore minimal.

In one embodiment there is provision that a frequency of the actuation of at least one of the ultrasonic sensors within a measuring cycle is defined as a function of the current relative position. As a result, that sensor in whose detection range the object is located or else into whose detection range the object is moving can be actuated more frequently than the other sensors. As a result it is ensured, on the one hand, that the object can be detected particularly quickly by means of the ultrasonic system. On the other hand, this has the advantage that the other ultrasonic sensors can also be actuated within the measuring cycle—in particular only once—and as a result the entire detection range of the ultrasonic system can be checked for objects which are possibly present and which the camera possibly could not detect.

If at least two objects which are detected by means of the detection device are present in the surroundings of the motor vehicle, it is possible, for the purpose of configuring the measuring cycles—that is to say for the definition of the actuation of the ultrasonic sensors within a measuring cycle—also to take into account the respective speed of the at least two objects. As a result, the actuation of the ultrasonic system is carried out in a situation-dependent fashion and in accordance with requirements.

In one embodiment there is provision that by means of the detection device the respective current position of the object with respect to the motor vehicle is tracked. The sequence of the actuation of the ultrasonic sensors within a measuring cycle and/or the number of ultrasonic sensors to be actuated and/or the frequency of the actuation of an ultrasonic sensor within the measuring cycle can then be continuously set as a function of the respective current position. This means that the configuration of the measuring cycles is adapted continuously and constantly to the changing position of the object with respect to the motor vehicle. As a result, a relatively fast action of the ultrasonic system is always ensured, and the ultrasonic system quickly supplies new or current and precise distance values.

With respect to the configuration of the detection device, various embodiments are provided:

In one preferred embodiment, the detection device has a detection range which is wider in the horizontal direction than a detection range of an individual ultrasonic sensor. By means of the detection device, the current position of the object can therefore be determined over a relatively large detection range, with the result that reliable definition of the number of ultrasonic sensors to be actuated is also made possible. In particular, the horizontal detection range of the detection device is equal to or greater than the entire horizontal detection range of the ultrasonic system.

The range of the detection device is also preferably greater than the range of the ultrasonic sensors. As a result, the object can already be detected in advance, and the number of ultrasonic sensors to be actuated and/or the sequence of actuation and/or the specified frequency can also already be determined in advance before the object enters the detection range of the ultrasonic system. Even if the object is located outside the detection range of the ultrasonic system, during the current measuring cycles the number of ultrasonic sensors which are actuated within a measuring cycle and/or the sequence of actuation and/or the frequency can be defined as a function of the current position of the object.

At least one of the following devices can be used as a detection device for determining the current position of the object: a camera, in particular a video camera, and/or a radar device and/or an optical distance sensor, in particular a laser. All these devices permit the detection of objects over a relatively wide detection range and also have significantly greater ranges than ultrasonic sensors.

The invention also relates to a driver assistance device which is designed to carry out a method according to the invention.

A motor vehicle according to the invention comprises a driver assistance device according to the invention.

Further features of the invention can be found in the claims, the figures and the description of the figures. All the features and combinations of features specified above in the description and the features and combinations of features which are specified below in the description of the figures and/or shown solely in the figures can be used not only in the respectively specified combination but also in other combinations or else alone.

The invention will now be explained in more detail on the basis of individual preferred exemplary embodiments as well as with reference to the appended drawings, of which:

Figure 1:
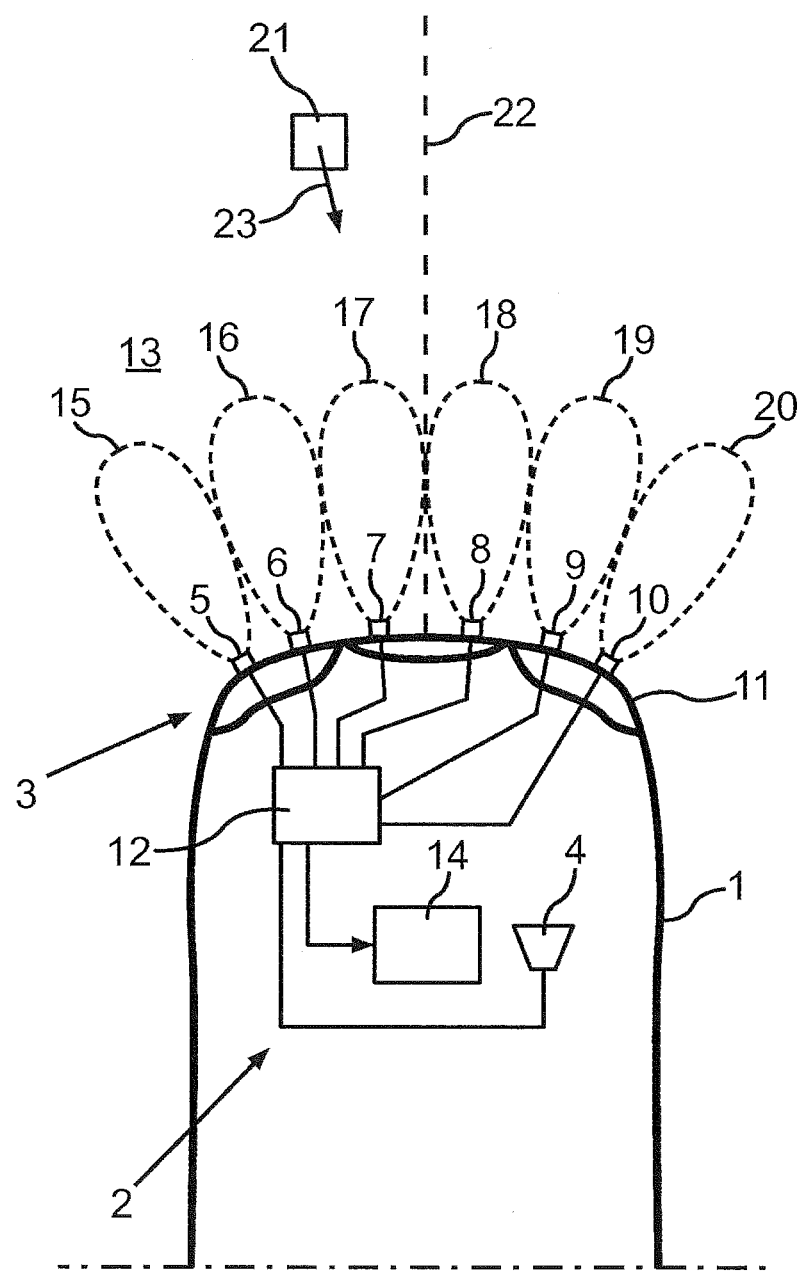
FIG. 1 is a schematic illustration of a front region of a motor vehicle according to an embodiment of the invention, which motor vehicle is in a first situation.

A motor vehicle 1 which is illustrated in FIG. 1 is, for example, a passenger car. The motor vehicle 1 contains a driver assistance device 2 which is designed to assist the driver when driving the motor vehicle 1. The driver assistance device comprises an ultrasonic system 3 as well as a detection device which is embodied as a camera 4, specifically a video camera, in the exemplary embodiment.

The ultrasonic system 3 contains, for example, six ultrasonic sensors 5 to 10 which are arranged distributed on a front bumper 11. The number and the arrangement of the ultrasonic sensors 5 to 10 are illustrated merely by way of example in FIG. 1. The number and the arrangement of the ultrasonic sensors 5 to 10 can be different depending on the embodiment. Ultrasonic sensors can also be attached to a rear bumper of the motor vehicle 1 and can be actuated in the same way.

The ultrasonic sensors 5 to 10 are electrically connected to an electronic control device 12 and are actuated by means of the control device 12. The control device 12 can contain, for example, a microcontroller and/or a digital signal processor.

The control device 12 determines distances between the motor vehicle 1 and the objects which are located in the surroundings 13 of the motor vehicle 1, on the basis of the signals of the ultrasonic sensors 5 to 10. These distances can then be output using an output device 14 which can have a loudspeaker and/or a display. If appropriate, this measuring data can also be used for the automatic parking function.

The camera 4 is, for example, a CCD camera or else a CMOS camera. It can be located, for example, behind the windscreen. Alternatively it is also possible to provide that the camera 4 is arranged on the bumper 11.

The ultrasonic sensors 5 to 10 have respective detection ranges 15 to 20 which can overlap one another, if appropriate in pairs, or else can lie relatively close to one another. The range of an individual ultrasonic sensor 5 to 10 can be, for example, 2.5 meters and is basically dependent on the respective configuration. The range of an individual ultrasonic sensor 5 to 10 can generally be between 2 meters and 10 meters.

The camera 4 has a relatively wide detection angle, with the result that the horizontal detection range of the camera 4 overall is greater than the entire detection range of all the ultrasonic sensors 5 to 10 together and therefore covers all the detection ranges 15 to 20. As is known, the camera 4 also has a larger range than the ultrasonic sensors 5 to 10. Objects which are located in the surroundings 13 are detected in the captured images of the camera 4. Such object detection algorithms, which serve to identify an object in captured images, are already prior art. The detected objects can then also be tracked by means of the camera 4, with the result that the current relative position of this object relative to the motor vehicle 1 is always known, and at least an angle of the object with respect to a central longitudinal axis 22 of the motor vehicle 1 is known. The relative position is therefore to be understood here as meaning, in particular, a target angle of the object, that is to say an angle between a straight line which connects the object and the vehicle 1, and a reference straight line (for example the central longitudinal axis 22 of the motor vehicle 1).

The ultrasonic sensors 5 to 10 are actuated in measuring cycles which are repeated. The measuring cycles can also differ from one another, with the result that, for example, the sequence of actuation of the ultrasonic sensors can vary from one measuring cycle to another. It is attempted to keep the duration of an individual measuring cycle as short as possible. Within an individual measuring cycle, a single ultrasonic sensor or else a subgroup of at least two ultrasonic sensors 5 to 10 of the ultrasonic system 3 can be actuated, specifically one after the other. The number of ultrasonic sensors 15 to 20 which are actuated within an individual measuring cycle, as well as, if appropriate, the sequence of actuation and the frequency of actuation of the individual sensors are defined here as a function of information of the camera 4. To be precise, the camera 4 detects, as already stated, the current relative position of an object relative to the motor vehicle 1. As a function of this position, the number of ultrasonic sensors 5 to 10 which are actuated within a measuring cycle and the sequence with which this actuation is to take place as well as how often an individual ultrasonic sensor 5 to 10 is to be actuated within a measuring cycle is then defined by means of the control device 12. This procedure will be explained in more detail below with reference to three different examples:

In FIG. 1 there is a vehicle-external object 21 in the surroundings 13, which object 21 is moving towards the motor vehicle 1 and is also located in the surrounding area in front of the motor vehicle 1, at an angle of approximately 10° from the central longitudinal axis 22 of the motor vehicle 1. The object 21 is located here on the left-hand side of the central longitudinal axis 22 and is moving in the direction of the motor vehicle 1 according to the illustrated arrow 23. The object 21 is then detected in the images of the camera 4 and tracked. The current position of the object 21 relative to the motor vehicle 1 and the current angle with respect to the central longitudinal axis 22 are therefore always known. Although the object 21 is not yet located in the detection range 15 to 20 of one of the ultrasonic sensors 5 to 10, the control device 12 can now already start the definition of the number of ultrasonic sensors 5 to 10 to be actuated and/or the sequence and/or the frequency. The control device 12 detects that the object 21 is moving in the direction of the detection range 17 of the ultrasonic sensor 7 and therefore into the detection range 17. Before the object 21 actually reaches the detection range 17, the ultrasonic system 3 is operated in such a way that, for example, exclusively the ultrasonic sensor 7 is actuated to emit its ultrasound. The current measuring cycles of the ultrasonic system 3 are therefore restricted to the actuation of the ultrasonic sensor 7, with the result that the duration of an individual measuring cycle is, for example, only 20 milliseconds. The other ultrasonic sensors 5, 6, 8, 9, 10 are not actuated. Alternatively, the sensor 7 can be actuated more frequently than the other sensors, while the other sensors are actuated only once per measuring cycle. If the object 21 then enters the detection range 17, this object 21 can be detected particularly quickly by means of the ultrasonic sensor 7 and the distance can be correspondingly measured and displayed. As a result of such actuation, the reaction time of the ultrasonic system is therefore reduced significantly compared to other systems.

Figure 2:
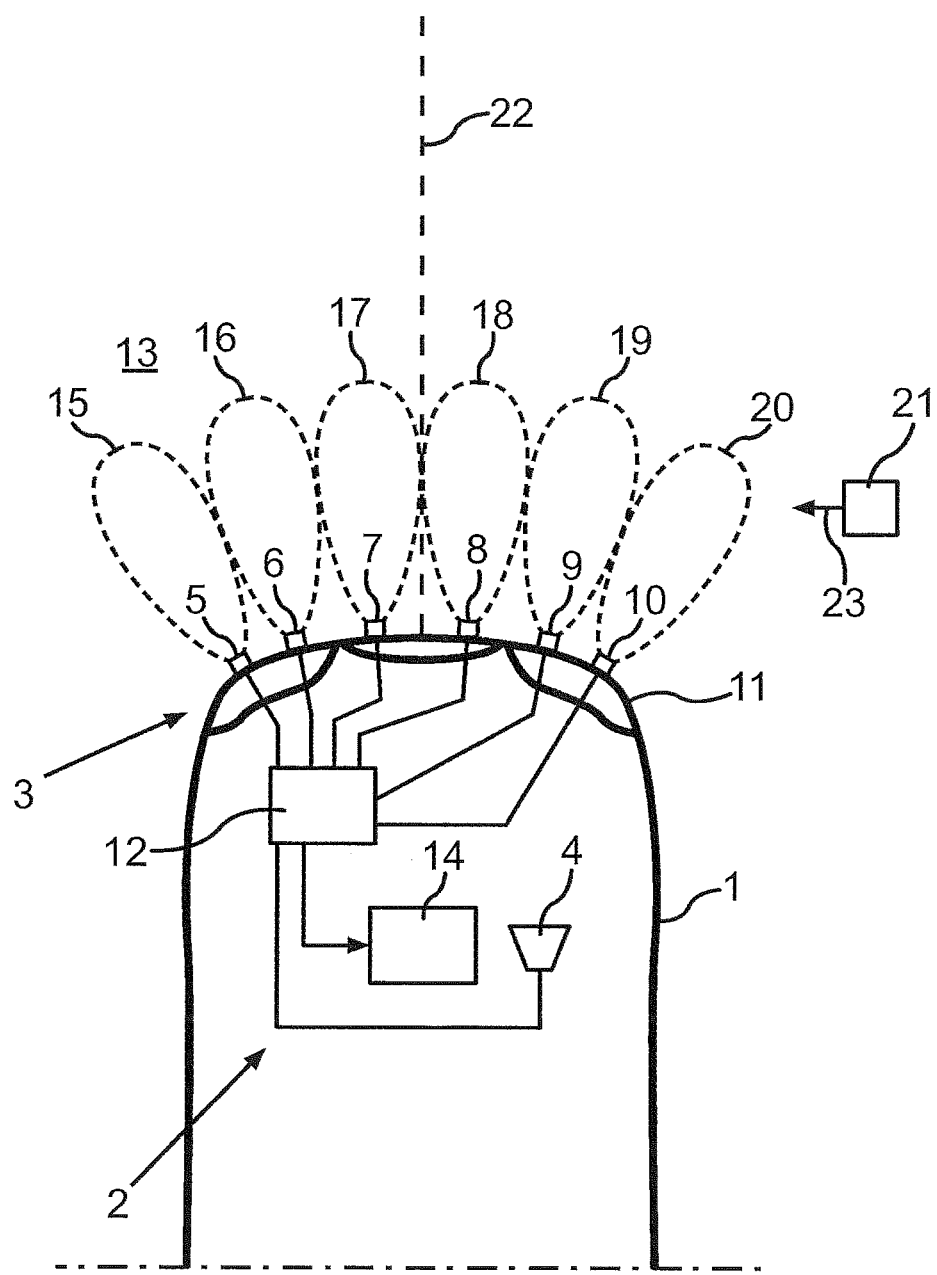
FIG. 2 is a schematic illustration of the motor vehicle which is in a second situation.

A further example is illustrated in FIG. 2. Here, the object 21 is located on the right-hand side next to the detection range 20 of the ultrasonic sensor 10 and is moving in the direction of the detection range 20, transversely with respect to the central longitudinal axis 22, specifically according to the illustrated arrow 23. This is detected by means of the camera 4 and the control device 12 actuates the ultrasonic system 3 in such a way that firstly exclusively the ultrasonic sensor 10 is actuated to emit its ultrasonic signal, while the other ultrasonic sensors 5 to 9 are not actuated. This means that a measuring cycle is restricted to the actuation of the ultrasonic sensor 10. The ultrasonic system therefore detects the object 21 particularly quickly by means of the ultrasonic sensor 10 because for the actuation of the ultrasonic sensor 10 it is not necessary to wait until the other ultrasonic sensors are also actuated.

If the object 21 then enters the detection range 20, the distance from the object 21 is immediately measured and displayed. After the object 21 has reached the detection range 20, the adjacent ultrasonic sensor 9 into whose detection range 19 the object 21 is moving can also be actuated within the measuring cycles. In other words, the closest ultrasonic sensor 9, whose detection range 19 is closest to the object 21, but in whose detection range 19 the object 21 is not yet located, is also actuated. If the object 21 is located within the detection range 20 of the outer ultrasonic sensor 10, exclusively the two ultrasonic sensors 9, 10 are actuated within the measuring cycles, specifically one after the other. If the object 21 then enters the detection range 19, the ultrasonic sensor 8 can additionally also be actuated while the actuation of the outer ultrasonic sensor 10 can, if appropriate, be interrupted. It is therefore possible to provide that at a specific time at most exclusively two ultrasonic sensors are actuated within one measuring cycle.

All the ultrasonic sensors 5 to 10 can optionally also be actuated within the measuring cycles, and the frequency of actuation of the ultrasonic sensors 5 to 10 within a measuring cycle can be defined as a function of the current position of the object 21. For example, here that ultrasonic sensor 5 to 10 in whose detection range the object 21 is located or else into whose detection range the object 21 is moving can be actuated twice or three times or even four times within one measuring cycle. The other ultrasonic sensors 5 to 10 can be actuated only once within one measuring cycle.

Figure 3:
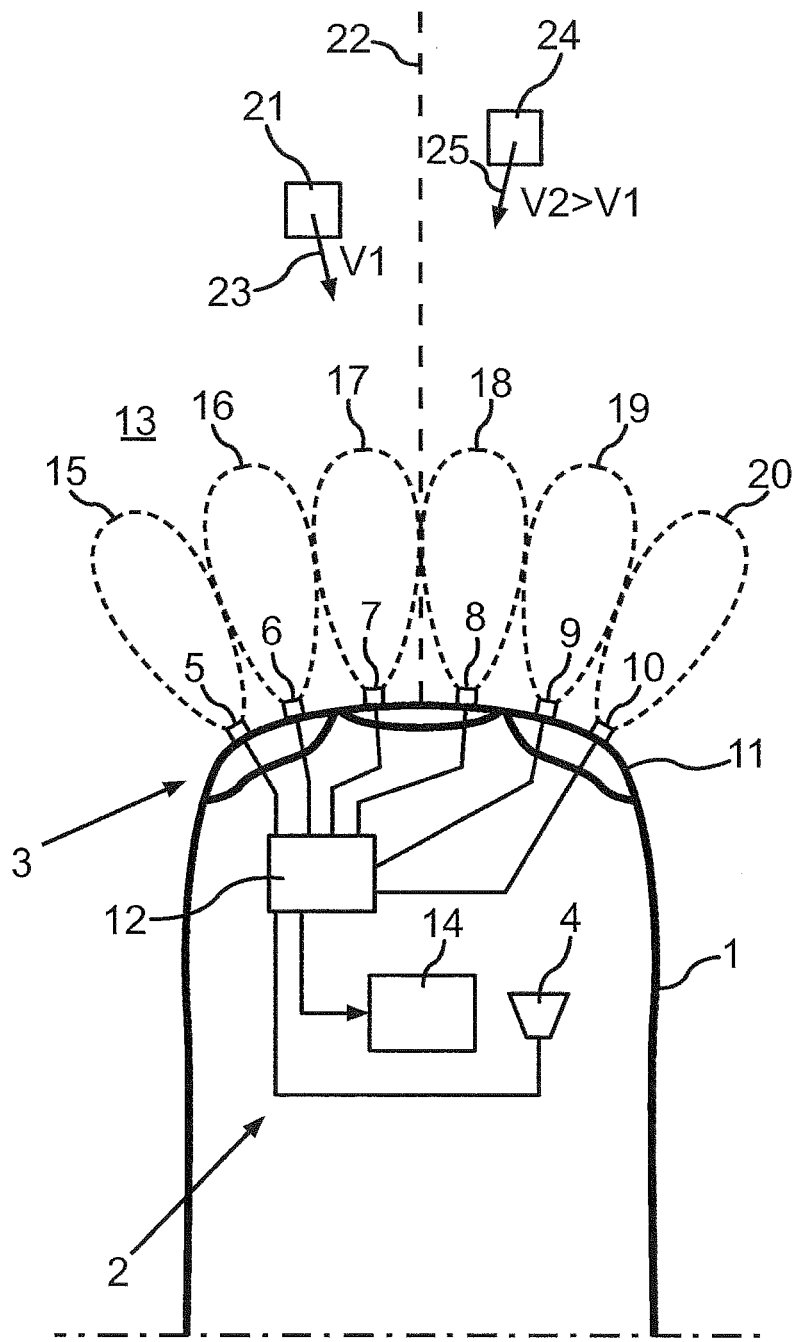
FIG. 3 is a schematic illustration of the motor vehicle which is in a third situation.

A further example is illustrated in FIG. 3. Here, a total of two objects 21, 24 which are moving towards the motor vehicle 1, specifically at different speeds, are located in the surroundings 13. While the first object 21 is moving at a speed v1 according to the illustrated arrow 23, the second object 24 is moving at a relatively high speed v2 according to the illustrated arrow 25. Both objects 21, 24 are tracked by means of the camera 4, with the result that the camera 4 also detects that the second object 24 is moving more quickly in the direction of the detection range 18 of the ultrasonic sensor 8. The camera 4 also detects that the first object 21 with the lower speed v1 is moving in the direction of the detection range 17. All this information about the current position and the speed of the objects 21, 24 is transmitted to the control device 12, which then actuates the ultrasonic system 3 accordingly.

For example, exclusively the ultrasonic sensors 7, 8 are now actuated within the measuring cycles, specifically firstly the ultrasonic sensor 8, in whose direction the second object 24 is moving more quickly. In this example, the other ultrasonic sensors 5, 6, 9, 10 are not actuated within the current measuring cycles.

Alternatively, all the ultrasonic sensors 5 to 10 can also be actuated, and the frequency of actuation of the ultrasonic sensors 7, 8 within one measuring cycle can be higher than the frequency of actuation of the ultrasonic sensors 5, 6, 9, 10. For example, the ultrasonic sensor 8 can be actuated three times during an individual measuring cycle, while the ultrasonic sensor 7 can be actuated twice, and the other ultrasonic sensors 5, 6, 9, 10 can be actuated only once. As a result, it is ensured, on the one hand, that the two objects 21, 24 can be detected particularly quickly by means of the ultrasonic system 3; on the other hand, the entire detection range of the ultrasonic system is also checked for possibly present objects which have possibly not been detected with the camera 4.

Overall, the number of sensors 5 to 10 which are actuated within a measuring cycle, and also the sequence of actuation and the frequency with which the individual sensors 5 to 10 are actuated within an individual measuring cycle or emit the ultrasonic signals, can therefore be defined as a function of the current position of the object 21, 24. When these parameters are defined, they can apply to a multiplicity of measuring cycles which are repeated one after the other. If the position of the object changes in such a way that at least one of the specified parameters also changes, at least this one parameter is newly defined for the subsequent measuring cycles. These are then also repeated periodically.

The invention claimed is:

1. A method for operating an ultrasonic system comprising:
a multiplicity of ultrasonic sensors which are arranged distributed on a motor vehicle and which are actuated in measuring cycles for the emission of an ultrasonic signal, wherein the measuring cycles are repeated,
wherein an object in the surroundings of the motor vehicle is detected by a detection device, different from the ultrasonic system, of the motor vehicle, and a current relative position of the object relative to the motor vehicle is determined, and wherein a number of ultrasonic sensors which are actuated within one measuring cycle is defined as a function of the current relative position.

2. The method according to claim 1, wherein a sequence of the actuation of the ultrasonic sensors within the measuring cycle is defined as a function of the current relative position.

3. The method according to claim 2, wherein within the measuring cycle that ultrasonic sensor in whose detection range the object is located, or into whose detection range the object is moving, is actuated as the first sensor.

4. The method according to claim 2, wherein within the measuring cycle the ultrasonic sensor which is closest to an object is actuated as the first sensor.

5. The method according to claim 1, wherein within the measuring cycle only at least one of the following ultrasonic sensors is actuated:
the ultrasonic sensor in whose detection range the object is located, and/or
the ultrasonic sensor into whose detection range the object is moving.

6. The method according to claim 2, wherein a frequency of the actuation of at least one of the ultrasonic sensors within the measuring cycle is defined as a function of the current relative position.

7. The method according to claim 6, wherein when at least two objects are detected in the surroundings by the detection device, a respective current speed of the at least two objects is determined by the detection device, and the sequence of the actuation of the ultrasonic sensors within the measuring cycle and/or the frequency of the actuation of at least one of the ultrasonic sensors within the measuring cycle and/or the number of ultrasonic sensors to be actuated within the measuring cycle are/is defined as a function of the speeds of the objects.

8. The method according to claim 6, wherein, via the detection device, the respective current position of the objects with respect to the motor vehicle is continuously tracked, and the sequence of the actuation of the ultrasonic sensors within a measuring cycle and/or the frequency of the actuation of at least one of the ultrasonic sensors within the measuring cycle and/or the number of ultrasonic sensors to be actuated are/is continuously set as a function of the respective current position.

9. The method according to claim 1, wherein the detection device has a detection range which is wider in a horizontal direction than a detection range of an individual ultrasonic sensor.

10. The method according to claim 1, wherein at least one camera is used as the detection device.

11. The method according to claim 1, wherein at least one radar device is used as the detection device.

12. The method according to claim 1, wherein at least one optical distance sensor is used as the detection device.

13. A driver assistance device for a motor vehicle, comprising
an ultrasonic system which has a multiplicity of ultrasonic sensors and a control device which is configured to actuate the ultrasonic sensors in measuring cycles for the emission of an ultrasonic signal, and to repeat the measuring cycles; and
a detection device which is different from the ultrasonic system and is configured to detect an object in the surroundings of the motor vehicle and to determine a relative position of the object relative to the motor vehicle,
wherein the control device is configured to define, as a function of a current relative position, a number of ultrasonic sensors which are actuated within one measuring cycle.

14. A motor vehicle having a driver assistance device according to claim 13.

15. The method of claim 12, wherein the at least one optical distance sensor is a laser.

* * * * *